US005438745A

United States Patent [19]

Cox

[11] Patent Number: 5,438,745

[45] Date of Patent: Aug. 8, 1995

[54] METHOD OF INSTALLING A VEHICLE WINDOW UTILIZING A REUSEABLE ATTACHMENT MEMBER

[76] Inventor: Charles E. Cox, 1016 Superior St., Lot 6, Fort Myers, Fla. 33916

[21] Appl. No.: 239,958

[22] Filed: May 9, 1994

Related U.S. Application Data

[63] Continuation-in-part of Ser. No. 819,078, Jan. 10, 1992, Pat. No. 5,341,599.

[51] Int. Cl.[6] .......... B23P 11/02

[52] U.S. Cl. .......... 29/525.1; 29/451

[58] Field of Search .......... 49/375, 374; 411/44, 411/57, 71, 73, 182, 907, 908; 29/525.1, 451

[56] References Cited

U.S. PATENT DOCUMENTS

| | | | |
|---|---|---|---|
| 2,168,242 | 8/1939 | Roethel | 49/375 X |
| 2,921,819 | 1/1960 | Rifkin | 411/44 X |
| 3,505,922 | 4/1970 | Tinnerman | 411/57 |
| 4,240,323 | 12/1980 | Kijima | 411/182 X |
| 4,367,995 | 1/1983 | Mizusawa et al. | 411/57 |
| 5,036,621 | 8/1991 | Iwasaki | 49/375 X |
| 5,065,545 | 11/1991 | Kane et al. | 49/375 |

FOREIGN PATENT DOCUMENTS

| | | | |
|---|---|---|---|
| 979470 | 1/1965 | United Kingdom | 411/71 |

*Primary Examiner*—Peter M. Cuomo

*Assistant Examiner*—Jerry Redman

[57] ABSTRACT

This invention is directed to a new and simplified method of installing a vehicle window glass in the glass carrier or regulator of a vehicle. By this method the glass can be mounted more securely and in considerably less time than has heretofore been required. An attachment member, preferably formed of plastic or nylon, is provided. The attachment member is reuseable permitting removal and replacement of the existing glass or a replacement glass. The attachment member has a central aperture and a plurality of circumferentially spaced axially extending angular prongs partially overlying the central aperture and having humps at about the mid-section of the extending surfaces. The inner ends of the axially extending members are of slightly less diameter than are the precut internal diameter of the apertures in the replacement window. These prongs, being formed of a slightly pliable material, will deflect inwardly sufficiently to permit the slightly enlarged humps of the attachment member to be snapped through the precut apertures in the replacement windows. By this arrangement the attachment members remain in place while the automobile window glass is positioned by the installation technician. The window is then aligned with the regulator, and the screw is threaded through the aperture of the regulator and through the aperture of the attachment member to deflect the prongs outwardly to securely clamp the window to the regulator.

8 Claims, 1 Drawing Sheet

METHOD OF INSTALLING A VEHICLE WINDOW UTILIZING A REUSEABLE ATTACHMENT MEMBER

This application is a continuation-in-part application of U.S. Ser. No. 07/819,078, filed Jan. 10, 1992, now U.S. Pat. No. 5,341,599 and entitled "A replacement vehicle window attachment" (as amended), originally entitled "Method of installing a replacement vehicle window".

The disclosure of the parent application, U.S. Pat. No. 5,341,599, is hereby incorporated by reference.

BACKGROUND

The automobile window glass applicable to the current invention are those that are capable of being raised and lowered and which are connected to regulators. The regulators are acted upon by another mechanism to cause the raising and lowering action. These windows are generally located in either the doors or rear seat areas of vehicles. A common method utilized to secure the glass to the regulator is permanent rivets. Pre-existing apertures in the glass are aligned with the apertures in the regulators, and then riveted in place. This method has several disadvantages that make it less effective than desired. The first being the inability to remove existing rivet connectors without requiring special equipment, such as a drill. The second being that special equipment, such as a riveter, is required to install a window glass. A third disadvantage rest in the fact that metal to glass is often currently used to secure the automobile window glass to the regulator. A fourth disadvantage is the fact that excess force is placed upon the automobile window glass during the installation procedure of the riveting method.

For the foregoing reasons, there is a need for an installation method that permits removal of the existing glass and replacement, with the original or a replacement glass, without requiring special equipment. Such a method is needed while eliminating any metal to glass contact at the securing locations and while eliminating undue excess pressure being applied to the glass during installation.

SUMMARY

The present invention is directed to a method of installing an automobile window glass without requiring special equipment, while permitting removal of the newly installed window and reinstallation, utilizing the same attachment member.

An attachment member is provided that is of a one piece construction and reuseable. The attachment member has a flat end member with an aperture penetrating therethrough at a generally midpoint. On one side extends several prongs, each comprised of two intersecting planes. These prongs are in a circumerentially spaced pattern around the central aperture and each slightly overlaps the aperture. The prongs of the attachment member are inserted into an aperture of the automobile window glass from the side which will be nearest the regulator following installation. Once all the apertures that are being utilized have an attachment member in place, the automobile window glass is positioned with the end members of the attachment members against the regulator. Then the apertures of the regulator are aligned with the apertures of the attachment members. Then a screw is inserted through each applicable aperture of the regulator into each of the attachment members. This insertion action causes the threads of the screw to come into contact with the part of each prong that overlies the aperture of the attachment member. The screw thus causes the prongs to pivot outward from the aperture and cause a secure radial engagement of the aperture of the automobile window glass. Thus the automobile window glass is securely clamped to the regulator while providing a complete absents of metal to glass contact. The automobile window glass is easily removed from the regulator by utilizing a screw driver to remove the screw. Then the same attachment member can be reused.

BRIEF DESCRIPTION OF THE DRAWINGS

These and other features, aspects, and advantages of the present invention will become apparent to those skilled in the art from the following description, appended claims, and accompanying drawings where;

DESCRIPTION

Figure 1:
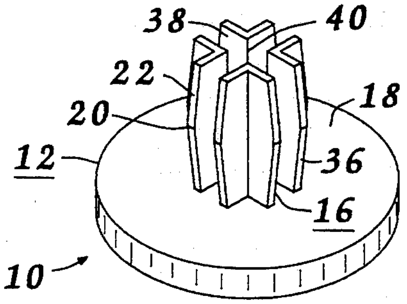
FIG. 1 is a perspective view of an embodiment of an attachment member.
Figure 2:
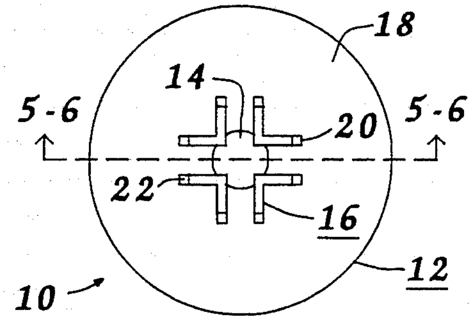
FIG. 2 is a top view showing one side of the attachment member shown in FIG. 1.
Figure 3:
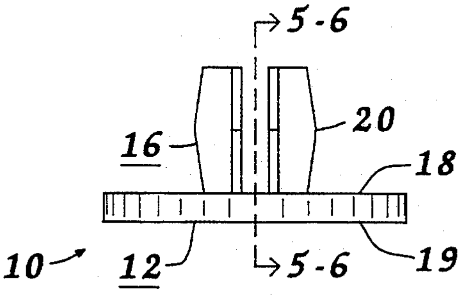
FIG. 3 is a side view of the attachment member shown in FIG. 1 and FIG. 2.

Referring now to the drawings where like reference numerals refer to like parts throughout the various views. FIGS. 1, 2 and 3 show a reuseable attachment member 10 having an end member 12 and four prongs 16, each extending from end member 12. Reuseable attachment member 10 is formed of a plastic or nylon material in a mold and is of one piece. Being constructed of a slightly pliable material, the various features of the device are relatively rigid yet slightly flexible. An aperture 14, shown in FIG. 2, penetrates end member 12 from a first side 19, shown in FIG. 3, to a second side 18. It being noted that prongs 16 are positioned in a circumerentially spaced pattern around aperture 14, and that each prong 16 overlaps aperture 14, as shown in FIG. 2. It being understood that the sections of prongs 16 that overlie aperture 14 do not extend below the surface of second side 18. Each prong 16 is formed of two intersecting extending surfaces 38 which have a predetermined thickness and join to form a contact edge 40. Each contact edge 40 overlies aperture 14. The collective prongs 16 have a predetermined radial thickness where they meet end member 12. This radial thickness is equal to or slightly less than the diameter of the window aperture 26, shown in FIG. 5 and FIG. 6. Extending upward along each prong 16 from end member 12 is a contact surface 36 which will be in contact with the automobile glass 24 during use, as shown in FIG. 6. The radial thickness of prongs 16 at their opposing end from end member 12 is slightly less than the diameter of the window aperture 26, shown in FIG. 5 and FIG. 6. This will permit an easy insertion into the window aperture 26. An insertion surface 22 is provided on each extending surface 38 which gradually taper upward to a hump 20. The radial thickness of humps 20 is slightly greater than the diameter of window aperture 26. Insertion surfaces 22 act to cause prongs 16 to bend inward toward aperture 14 during the insertion operation. Humps 20 prevent attachment member 10 from inadvertently slipping from window aperture 26 during the installation procedure.

Figure 4:
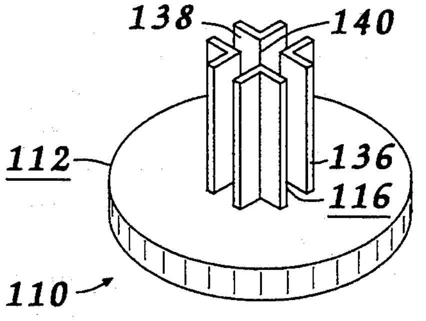
FIG. 4 is a perspective view of a second embodiment of an attachment member.

FIG. 4 shows a second embodiment of a reuseable attachment member 110 having an end member 112 and four extending prongs 116. It being noted that the radial thickness of the collective prongs 116 is relatively even from end to end. It being understood that an aperture is present at a relatively central position on end member 112 as disclosed above. Each prong 116 is comprised of a pair of intersecting extending surfaces 138 which form a contact edge 140. Each contact edge 140 overlies the aperture. Each extending surface 138 has a contact surface 136 which will be in contact with the automobile glass following the installation procedure.

Figure 5:
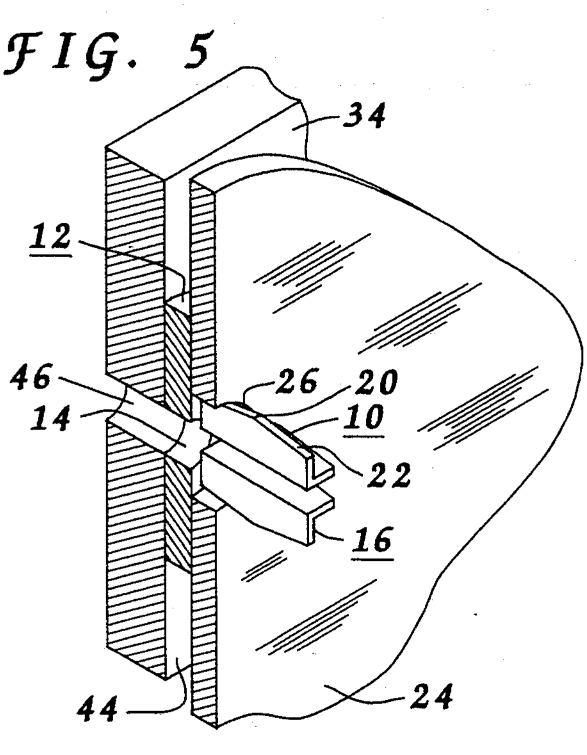
FIG. 5 is a sectional perspective view of the attachment member of FIG. 1, as viewed from the section lines shown in FIG. 2 and FIG. 3, further showing a regulator and an automobile glass.
Figure 6:
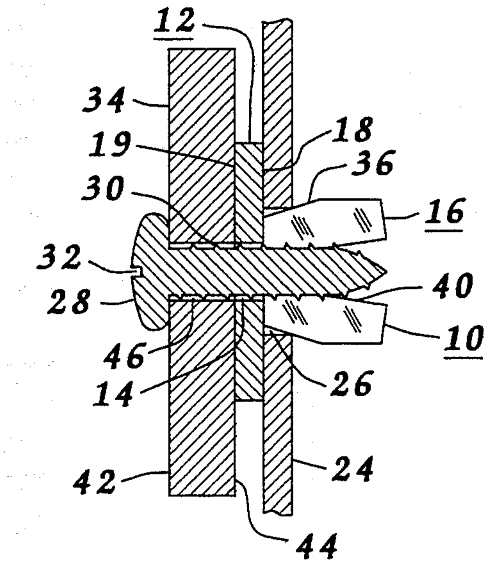
FIG. 6 is a plan view of the assembly shown in FIG. 5 following insertion of a screw.

FIG. 5 and FIG. 6 show sectional views of the reuseable attachment member 10 as taken from the section lines shown in FIG. 2 and FIG. 3. Also show is a regulator 34 having a regulator aperture 46 and an automotive glass 24 having a window aperture 26. FIG. 5 shows reuseable attachment member 10, having aperture 14, properly inserted in window aperture 26 and properly aligned with regulator aperture 46. First side 19 of end member 12 is in contact with attachment side 44 of regulator 34, as shown in FIG. 6, and second side 18 of end member 12 is in contact with automobile glass 24. FIG. 5 shows reuseable attachment member 10 following insertion into window aperture 26. Prongs 16 have been pushed through window aperture 26 with insertion surfaces 22 coming into contact with window aperture 26. Such contact caused prongs 16 to bend inward until each hump 20 was traversed. Reuseable attachment member 10 is then held securely within window aperture 26. FIG. 6 shows the proper insertion of screw 28 having screw threads 30 and a screw slot 32. Insertion was performed by turning screw 28 utilizing screw slot 32. Screw 28 is firmly seated against securing side 42 of regulator 34. As illustrated, screw threads 30 have a radial diameter approximately equal to the diameter of regulator aperture 46 and aperture 14. Prongs 16, which partially overlie aperture 14, are forced radially outward by the contact of screw threads 30 with each contact edge 40. This movement of prongs 16 causes each contact surface 36 to securely contact automotive glass 24 at the inner edges of window aperture 26. Screw threads 30 are capable of digging into and slightly penetrating prongs 16, as prongs 16 are formed of a slightly pliable material. The spreading action thus causes automobile glass 24 and regulator 34 to be drawn firmly to end member 12. It being noted that automobile glass 24 is only in contact with reuseable attachment member 10 and not screw 28 or regulator 34.

Advantages of the invention

The previously described embodiments of the present invention have many advantages, including the ability to attach a window glass to a regulator and then detach same and reinstall the same, or a replacement glass, utilizing the same attachment member. Additionally metal to glass contact, at the location of connection, is eliminated completely, providing a corresponding reduction in stress to the glass. A further advantage is provided by permitting operation utilizing a common screwdriver as compared with special equipment such as a rivet gun.

Alternatives

While attachment members having four prongs have been disclosed, attachment members having three, five or six prongs are envisioned and disclosed. The method of using a reuseable attachment member is operational with any similarly configured attachment member having circumferentially evenly spaced prongs having paired intersecting surfaces. While a round end member has been disclosed, various possible shapes are envision and disclosed such as oval, triangular, square, rectangle, pentagon and hexagon, amongst others.

I claim:

1. A method of attaching an automobile window glass having an aperture penetrating therethrough, to a window regulator, the window regulator adaptable for raising and lowering the automobile window glass, the window regulator having an attachment side, a securing side and an aperture penetrating from the attachment side to the securing side, the method comprising;

a) providing an attachment member, being of a one piece construction and being reuseable, the attachment member comprising;
   1) an end member, the end member having a first side, a second side and an aperture penetrating from the first side to the second side;
   2) a plurality of prongs extending from the second side of the end member, each prong having a pair of intersecting surfaces forming a contact edge, each of the intersecting surfaces having a contact surface, the prongs positioned in a circumferentially spaced pattern around the aperture of the end member, the contact edge of each prong overlying the aperture of the end member;

b) inserting the prongs of the attachment member into the aperture of the automobile window glass until the second side of the end member of the attachment member comes into contact with the automobile window glass;

c) positioning the first side of the end member of the attachment member in contact with the attachment side of the window regulator, the aperture of the window regulator aligned with the aperture of the attachment member;

d) inserting a screw having threads, such insertion utilizing rotation means, through the aperture of the window regulator, the insertion from the securing side of the window regulator, through the aperture of the attachment member, the threads of the screw in contact with the contact edge of each prong, the insertion of the screw causing the prongs to radially extend outward from the aperture of the end member of the attachment member to bring each contact surface of each prong into contact with the automobile window glass, the prongs overlying the glass to securely clamp the automobile window glass to the window regulator.

2. The method of claim 1 wherein the end member of the attachment member is relatively circular in shape.

3. The method of claim 1 wherein the prongs of the attachment member extend relatively perpendicularly from the second side of the end member of the attachment member.

4. The method of claim 1 wherein the pair of intersecting surfaces of each prong intersect one another relatively perpendicularly.

5. The method of claim 1 wherein the attachment member is formed of nylon.

6. The method of claim 1 wherein the attachment member is formed of plastic.

7. The method of claim 1 wherein each intersecting surface of each prong of the attachment member gradually increase in thickness and converge to a maximum radial thickness at a substantially midpoint position on the prong, the maximum radial thickness to prevent displacement of the attachment member from the aperture of the automobile window glass during the positioning.

8. The method of claim 1 wherein the attachment member comprises four prongs.

* * * * *